United States Patent [19]

Kratel et al.

[11] 4,298,387
[45] Nov. 3, 1981

[54] AGGLOMERATED MIXTURES OF HIGHLY DISPERSED METAL OXIDES AND OPACIFIERS

[75] Inventors: Günter Kratel, Durach-Bechen; Hans Katzer, Munich; Stephan Loskot, Kempten; Wilfried Lang, Sulzberg; Klaus Weis, Munich, all of Fed. Rep. of Germany

[73] Assignee: Consortium für Elektrochemische Industrie GmbH, Munich, Fed. Rep. of Germany

[21] Appl. No.: 102,510

[22] Filed: Dec. 11, 1979

[30] Foreign Application Priority Data

Dec. 20, 1978 [DE] Fed. Rep. of Germany ....... 2854984

[51] Int. Cl.$^3$ ............................................. C04B 35/52
[52] U.S. Cl. ....................................... 501/92; 501/93; 501/94; 501/126; 501/133
[58] Field of Search ................... 264/117; 106/43, 44, 106/55, 65, 69, 288 B, 309

[56] References Cited

U.S. PATENT DOCUMENTS

| | | | |
|---|---|---|---|
| 3,055,831 | 9/1962 | Barnett et al. ........................ | 252/62 |
| 3,669,889 | 6/1972 | Juzvuk et al. ........................ | 264/117 |
| 3,894,882 | 7/1975 | Takewell et al. ................ | 106/288 B |
| 4,048,290 | 9/1977 | Lee ................................. | 106/288 B |
| 4,132,560 | 1/1979 | Marquisee et al. ............. | 106/288 B |
| 4,173,491 | 11/1979 | Abrams et al. ................... | 106/288 B |

FOREIGN PATENT DOCUMENTS

| | | | |
|---|---|---|---|
| 2487 | 6/1979 | European Pat. Off. .............. | 501/89 |
| 1905673 | 8/1971 | Fed. Rep. of Germany ...... | 106/299 |
| 2036124 | 3/1973 | Fed. Rep. of Germany ...... | 501/133 |
| 2806367 | 8/1978 | Fed. Rep. of Germany ...... | 501/133 |
| 2712625 | 9/1978 | Fed. Rep. of Germany ...... | 501/133 |

*Primary Examiner*—James Poer
*Attorney, Agent, or Firm*—Allison C. Collard; Thomas M. Galgano

[57] ABSTRACT

An agglomerated mixture includes 30–95% by weight of highly dispersed metal oxides produced by flame hydrolysis and 5–70% by weight of inorganic opacifiers that have at least one absorption maximum in the range between 1.5 and 10 μm, selected from the group consisting of inorganic oxides and mixed oxides, carbides and nitrides. The invention also relates to a process of manufacturing the mixtures and to their use as heat-insulating material and the like.

7 Claims, No Drawings

AGGLOMERATED MIXTURES OF HIGHLY DISPERSED METAL OXIDES AND OPACIFIERS

The invention relates to agglomerated mixtures of highly dispersed metal oxides and opacifiers, a process for their manufacture, and the use of these mixtures as heat-insulating material.

Mixtures of highly dispersed metal oxides and fine particulate inorganic material have previously been described. For example, DE-AS 20 36 124 describes an insulating plate consisting of particulate insulating material that is produced by intimately mixing together a silica aerogel, an opacifier and, if desired, a fibrous material. These mixtures are produced by intensively mixing the individual components. This procedure involves a relatively high energy expenditure. Notwithstanding this fact, these mechanical mixing processes do not succeed in achieving complete intermingling of the individual components. Heat-insulating plates produced from these mixtures can be formed with useful strength properties only by applying high pressure. These insulating plates, which consist merely of mechanically mixed components, lack durability if used continuously.

The problem of the invention was to provide mixtures of flame-hydrolyzed, highly dispersed metal oxides and inorganic opacifiers, optionally in the presence of binders, which can be produced without high expenditures of mechanical stirring and in which the intermixing of the individual components is improved.

The object of the invention is to prepare finely divided inorganic material that is suitable for the manufacture of heat-insulating plates having good mechanical properties.

This and other related objects are attained in accordance with the invention by the provision of agglomerated mixtures comprising:
1. 30–95% by weight of highly dispersed metal oxides produced by flame hydrolysis, preferably highly dispersed silica, or mixtures or mixed oxides thereof; and
2. 5–70% by weight of inorganic opacifiers that have at least one absorption maximum in the range between 1.5 and 10 μm, selected from the group consisting of inorganic oxides and mixed oxides, carbides and nitrides.

Certain of the foregoing and related objects are also achieved according to the invention in a process for the manufacture of these mixtures which is characterized in that the inorganic opacifier is continuously mixed, in the desired mixing ratio, with the flame-hydrolyzed metal oxide in the first one-third of the agglomeration plant, and is co-agglomerated with the metal oxide while agglomerating the same subsequent to the flame hydrolysis. The opacifier may, alternatively, be added in the combustion chamber during the manufacture of the flame-hydrolyzed metal oxide.

Certain of the foregoing and related objects are also attained in accordance with the invention by the use of heat-insulating material formed from these mixtures in mechanically compressed form, optionally in combination with up to 40% by weight of binder.

Surprisingly, heat-insulating material formed from the agglomerated mixtures manufactured in accordance with the process of the invention frequently have greater strength characteristics as compared with conventional mixtures which are produced with high mechanical expenditures. It must furthermore be said that, with the same proportion of inorganic opacifier in the highly dispersed metal oxide matrix produced by flame hydrolysis, as compared with the known art, improved heat-insulating properties are achieved.

The agglomerated mixtures according to the invention, as compared with those produced in accordance with the state of the art by intensive mixing of the individual components, are distinguished by the fact that, although they are produced with low mechanical expenditures, they have a higher degree of intermingling of the individual components. The manufacture of flame-hydrolyzed metal oxides is generally known by those skilled in the art. The procedure typically involves the introduction of volatile or vaporizable metal compounds into a flame burning in a closed chamber where they react in the flame to form highly dispersed metal oxides. The resulting combustion gases and the metal oxides, which are in an extremely finely divided form, are then agglomerated in an agglomeration plant to form composite particulate bodies and the volumetric density is thereby increased. At the point when the fine particulate metal oxides are produced, that is to say before agglomeration in the agglomeration plant, the fine particulate metal oxides have properties that have hitherto not been considered. Examples of agglomeration plants are cyclones, pipe bends or pipes with deflecting means.

Flame-hydrolyzed highly dispersed metal oxides are produced industrially in large amounts. Such metal oxides are, for example, silicon dioxide, aluminum oxide, titanium oxide and sometimes also zirconium oxide. Probably the most important in this connection is silicon dioxide in pure form, in the form of mixtures with other of the mentioned metal oxides, or in the form of mixed oxides of silicon and the above-mentioned metal oxides.

Suitable inorganic opacifiers that can be used in the process according to the invention are, for example, as follows: ilmenite, titanium dioxide, silicon carbide, mixed ferrous and ferric oxides, chromium dioxide, zirconium oxide, manganese dioxide and iron oxide.

These inorganic opacifiers have an absorption maximum of between 1.5 and 10 μm in the infra-red range. It is of no importance in this connection whether the absorption has individual maxima or a continuous complete absorption in this range. For utilizing the agglomerated mixtures in accordance with the invention, it is within the experience of the average person skilled in the art, in order to achieve higher strengths, to use, along or in admixture, opacifers that have anisotropic geometric forms, such as e.g., a fibrous or platelet structure.

The agglomerated mixtures according to the invention consist of 30 to 95% by weight of highly dispersed metal oxides produced by flame hydrolysis, preferably highly dispersed silicon dioxide, or mixtures or mixed oxides thereof, and 5 to 70% by weight of the inorganic opacifier.

The process according to the invention for the manufacture of these agglomerated mixtures is characterized in that the inorganic opacifiers are continuously introduced during the manufacturing process of the flame-hydrolyzed metal oxide, in the desired mixing ratio directly in the region in which the flame-hydrolyzed metal oxides are still in the form of primary particles. This can advantageously be carried out in the first one-third of the agglomeration plant, in which the flame-hydrolyzed metal oxide is still in the form of primary particles having an active surface area. Obviously, it is possible to introduce the opacifier into the product flow before the agglomeration plant, but care must be taken when adding oxygen-sensitive inorganic opacifiers to ensure that the point of addition is so selected that no disadvantageous secondary reactions can occur. Normally the opacifier is added in the first one-third of the agglomeration plant. The addition is effected, for example, by way of a metering device, the opacifier optionally being sparyed into the agglomeration system under excess pressure, or being mixed with the metal oxide primary particles by simple static or mechanically moved stirring devices in the agglomeration plant. At the end of the agglomeration time, in accordance with the process of the invention, the result is a product that, with respect to the degree of intermingling of the components, clearly differs from products that have been produced merely by mechanically mixing ready-made, flame-hydrolyzed, metal oxide products with opacifiers.

The mixtures according to the invention are used especially as a heat-insulating material. To produce such a material, the coagglomerated, de-acidified and dried product removed from the agglomeration plant is compressed in the normal manner, optionally in vacuo, then formed into shaped members by applying mechanical pressure. The shaped members, are for example, plates, cubes, parallelepipeds or spheres. The pressure applied is generally between 5 and 15 bar, but higher pressures should not necessarily be excluded. The addition of binders, whether inorganic or organic, may sometimes be of advantage. Such binders are, for example, inorganic oxides that may be added in quantities of up to 5% by weight, and the metal oxides and opacifiers can be cemented together by forming, for example, glass-type structures. It is also possible for organic binders to be added to improve the basic or green structure of the shaped members.

In the following, the invention will be more fully described in a number of examples, which are given by way of illustration and not of limitation.

EXAMPLE I

In an experimental plant with an hourly capacity of 10 kg of $SiO_2$, highly dispersed silicon dioxide (fume silica) was produced from $SiCl_4$ in accordance with a known process. The BET specific surface area was 250 m$^2$/g. By means of a metering screw, ilmenite powder [IL F, BET=8.4 m$^2$/g, bulk density=1133 g/l] was introduced into the flow of primary particles before the agglomeration section at such a speed that the agglomerated product had an ilmenite content of 15%. In the waste gas flow, a temperature of approximately 350° C. prevailed. When coagglomeration was complete the product was separated in a cyclone. The solid was then de-acidified in a fluidized bed at 600° C.

The concentration of ilmenite was determined gravimetrically by fuming the samples with hydrofluoric acid, taking into account the loss in weight of pure ilmenite during this treatment.

To produce compressed plates, 50 g, of the coagglomerate were introduced into a cylinder (10.7 cm diameter, vacuum connection at the base plate). While evacuating, the coagglomerate was compressed to a thickness of 2 cm. The pressure was 150 Newton/cm$^2$.

The heat conductivity was determined in accordance with the hot wire process (tentative standard DIN 51 046, part 1).

The pressure resistance of the compressed plates was determined according to DIN 53 456.
Result: Heat conductivity ($\lambda$)=0.028 (W·m$^{-1}$·K$^{-1}$)
Ball pressure hardness (H)=153 (Newton/cm$^2$)

EXAMPLE II

The experiment described in Example I was repeated except that the ilmenite was metered in in such a manner that the coagglomerated product contained 45% of ilmenite.
Result: Heat conductivity ($\lambda$)=0.021 (W·m$^{31\ 1}$·K$^{-1}$)
Ball pressure hardness (H)=125 (Newton/cm$^2$)

EXAMPLE III

The experiment described in Example I was repeated, except that, instead of ilmenite, titanium dioxide [produced by Bayer Titan A, Leverkusen, West Germany, BET=8.1 m$^2$/g, bulk density=584 g/l] was used and the $TiO_2$ was metered in in such a a manner that the coagglomerated product contained 15% of $TiO_2$.
Result: Heat conductivity ($\lambda$)=0.024 (W·m$^{-1}$·K$^{-1}$)
Ball pressure hardness (H)=95 (Newton/cm$^2$)

EXAMPLE IV

The experiment described in Example I was repeated except that, instead of ilmenite, boron nitride [produced by Elektroschmelzwerk Kempten, Munich, West Germany, BN-S, BET=15.8 m$^2$/g, bulk density=420 g/l, 0.17% by weight of $B_2O_3$] was used and the boron nitride was metered in in such a manner that the coagglomerated product contained 14% of BN.
Result: Heat conductivity ($\lambda$)=0.028 (W·m$^{-1}$·K$^{-1}$)
Ball pressure hardness (H)=65 (Newton/cm$^2$).

COMPARISON EXAMPLE I 15 g of ilmenite powder [IL F, BET=8.4m$^2$/g, bulk density=1133 g/l] were mixed by stirring and triturating with 10 g of highly dispersed silicon dioxide (HDK T 30, produced by Wacker-Chemie GmbH, Munich, West Germany, BET=300 m$^2$/g, bulk density=5070 g/l) in a porcelain dish. This mixture was added, through a metal sieve having a mesh size of 1.5 mm, to 75 g of HDK, and the mixture was stirred. This mixture was then passed through the metal sieve two additional times while stirring continuously. An optically homogenous mixture resulted. To produce compressed plates, 50 g of the 15% ilmenite containing mixture was introduced into a metal cylinder (diameter 10.7 cm, vacuum connection in the base plate). While evacuating, the powder was compressed to a thickness of 2 cm. The pressure was 93 Newton/cm$^2$. The heat conductivity of this plate was determined in accordance with the hot wire process (tentative standard DIN 51046, part 1). The pressure resistance of the compressed plate was determined according to DIN 53456.
Result: Heat conductivity ($\lambda$)=0.032 (W·m$^{-1}$·K$^{-1}$)
Ball pressure hardness (H)=110 (Newton/cm$^2$)

COMPARISON EXAMPLE II

The experiment described in Comparison Example I was repeated except that the mixture contained 45% of ilmenite.
Result: Heat conductivity ($\lambda$)=0.025 (W·m$^{-1}$·K$^{-1}$)
Ball pressure hardness (H)=50 (Newton/cm$^2$)

COMPARISON EXAMPLE III

The experiment described in Comparison Example I was repeated except that, instead of ilmenite, titanium dioxide [produced by Bayer Titan A, Leverkusen, West Germany, BET=8.1 m²/g, bulk density=584 g/l] was used and the mixture contained 15% of $TiO_2$.

Result: Heat conductivity $(\lambda) = 0.035$ $(W \cdot m^{-1} \cdot K^{-1})$
Ball pressure hardness $(H) = 125$ $(Newton/cm^2)$

COMPARISON EXAMPLE IV

The experiment described in Comparison Example I was repeated except that, instead of ilmenite, boron nitride [produced by Elektroschmelzwerk Kempten, Munich, West Germany, BN-S, BET=15.8 m²/g, bulk density=420 g/l, 0.17% by weight $B_2O_3$] was used and the mixture contained 14% of BN.

Result: Heat conductivity $(\lambda) = 0.037$ $(W \cdot m^{-1} \cdot K^{-1})$
Ball pressure hardness $(H) = 122$ $(Newton/cm^2)$.

SYNOPSIS

Mixtures of metal oxides produced by flame hydrolysis and inorganic opacifiers are known. To maufacture these mixtures, expensive mixing processes are necessary in order to achieve intimate mixing of the individual components. In accordance with the process of the invention, the special activity of metal oxides produced by flame hydrolysis, as exists in the phase when they have just been formed, is exploited in order to mix inorganic opacifiers in a very fine distribution into the metal oxides produced by flame hydrolysis. Surprisingly these agglomerated mixtures have special properties of heat insulation, pressure resistance and durability.

What is claimed is:

1. In a process for the manufacture of an agglomerated mixture comprising 30–95% by weight of highly dispersed metal oxides produced by flame hydrolysis and 5–70% by weight of inorganic opacifiers that have at least one absorption maximum in the range between 1.5 and 10 μm, selected from the group consisting of inorganic oxides and mixed oxides, carbides and nitrides wherein volatile metal compounds are initially flame hydrolyzed in a combustion zone where they react with a flame to form highly dispersed metal oxides and are then agglomerated in an agglomeration plant, the improvement comprising the steps of:

continuously mixing said inorganic opacifiers with said flame-hydrolyzed metal oxides in the aforesaid percentages in a region in which the flame-hydrolyzed metal oxides are still in the form of primary particles; and coagglomerating said inorganic opacifiers while agglomerating said metal oxides subsequent to the flame hydrolysis.

2. An agglomerated mixture made according to claim 1 comprising:

30–95% by weight of higly dispersed metal oxides produced by flame hydrolysis; and 5–70% by weight of inorganic opacifiers that have at least one absorption maximum in the range between 1.5 and 10 μm, selected from the group consisting of inorganic oxides and mixed oxides, carbides and nitrides.

3. The mixture according to claim 2, wherein said highly dispersed metal oxides are selected from the group consisting of highly dispersed silicon dioxide, a silicon dioxide-containing admixture of metal oxides and a silicon-containing mixed oxide.

4. A heat-insulating material comprising, in mechanically compressed form, an agglomerated mixture made according to claim 1 comprising 30–95% by weight of highly dispersed metal oxides produced by flame hydrolysis and 5–70% by weight of inorganic opacifiers that have at least one absorption maximum in the range between 1.5 and 10 μm, selected from the group consisting of inorganic oxides and mixed oxides, carbides and nitrides.

5. The heat-insulating material according to claim 4, wherein said agglomerated mixture additionally includes up to 5% by weight of a binder.

6. The process according to claim 1, wherein said inorganic opacifiers are continuously added to said metal oxides in said combustion zone during the manufacture of the flame-hydrolyzed metal oxides.

7. The process according to claim 1, wherein said inorganic opacifiers are continuously added to said metal oxides in the first one-third of the agglomeration plant.

* * * * *